United States Patent [19]
Laely et al.

[11] 4,279,802
[45] Jul. 21, 1981

[54] METHOD FOR THE PRODUCTION OF A PIGMENT PREPARATION FOR COLORING LINEAR POLYESTERS IN THE MELT

[75] Inventors: Andreas Laely, Allschwil; Günther Zwahlen, Dornach, both of Switzerland; Lothar Buxbaum, Lindenfels, Fed. Rep. of Germany

[73] Assignee: Ciba-Geigy Corporation, Ardsley, N.Y.

[21] Appl. No.: 59,426

[22] Filed: Jul. 20, 1979

[30]   Foreign Application Priority Data

Aug. 1, 1978 [CH]   Switzerland ........................ 8218/78
Jun. 21, 1979 [CH]   Switzerland ........................ 5803/79

[51] Int. Cl.³ .............................................. C08L 67/00
[52] U.S. Cl. .............................. 260/40 P; 260/32.6 R; 260/32.8 R; 260/33.4 R; 260/40 R
[58] Field of Search ......... 528/301; 260/40 P, 32.6 R, 260/32.8 R, 33.4 R, 40 R

[56]   References Cited
U.S. PATENT DOCUMENTS

| 2,868,663 | 1/1959 | Jarmus ............................ 260/37 NP |
| 4,012,358 | 3/1977 | Cardenas et al. .................. 260/40 R |

FOREIGN PATENT DOCUMENTS 1044378   9/1966   United Kingdom .................. 260/40 R

*Primary Examiner*—J. Ziegler
*Attorney, Agent, or Firm*—Harry Falber

[57]   ABSTRACT

The invention provides a method for the production of a pigment preparation for coloring linear polyesters in the melt, which comprises forming a concentrate from 20 to 80 parts of pigment and 80 to 20 parts of a polyester which melts between 60° and 160° C., by kneading in the presence of a salt and a solvent or by a flush process, mixing said concentrate with a fibre forming linear polyester, melting the mixture and processing it to granules. The invention also provides the pigment preparation obtained by the process and the linear polyesters colored therewith.

8 Claims, No Drawings

METHOD FOR THE PRODUCTION OF A PIGMENT PREPARATION FOR COLORING LINEAR POLYESTERS IN THE MELT

It is known to colour linear polyesters in the melt with the aid of pigment preparations known as masterbatches. In this method, a thermoplastic resin which is mixed with a pigment in the form of granules, a powder or chips, is added to the fibre-forming polyester material.

In the method of British Pat. No. 1,044,378, the pigment concentrate is prepared by heating a mixture of pigment and low melting polyester to form a plastic mass, processing this mass to pellets, and then incorporating this preparation in the melt of a high melting polyester. The disadvantage of this method is that the pigment particles in the concentrate do not have the degree of distribution and fineness necessary for melt colouration. This proves especially disadvantageous when colouring with organic pigments and can be observed e.g. in an unacceptable rise in pressure in the melt spinning apparatus, in increased filament ruptures, in poor stretchability, in an impairment of the textile properties and, last but not least, in a poor tinctorial effect.

The method of U.S. Pat. No. 4,012,358 suggests overcoming these difficulties by preparing initially a concentrate consisting of 50 to 75 parts of polyethylene, which is then combined with one to four times the amount of polyester and the resulting blend is melted and processed to granules. However, the disadvantage of this method is that polyethylene and polyester are incompatible and have a pronounced tendency to form two phases, as a result of which inhomogenous mixtures are obtained, which in turn can impair the spinning and stretching as well as the fibre properties.

The present invention provides a method for the production of a pigment preparation for colouring linear polyesters in the melt which eliminates the disadvantages of both the known methods and which results in a product with an exceedingly fine distribution of the pigment in a resin which is compatible with the fibre-forming polyester. The method of the invention comprises forming a concentrate from 20 to 80 parts of pigment and 80 to 20 parts of a polyester which melts between 60° and 160° C. by kneading in the presence of a salt and a solvent or by a flush process, mixing said concentrate with a fibre-forming linear polyester, melting the mixture and processing the melt to granules.

Preferably 40 to 60 parts of pigment and 60 to 40 parts of polyester are used to form the concentrate.

Advantageously the concentrate consisting of pigment and polyester is mixed, melted and granulated with a fibre-forming linear polyester in an amount such that the granules contain 3 to 30% by weight, preferably 5 to 25% by weight, of pigment. Suitable pigments are both inorganic and organic pigments which are resistant to the polyester melt. Organic pigments are preferred. Examples of inorganic pigments are: metal oxides and sulfides, ultramarine, white pigments, such as titanium dioxide, and others. In addition to carbon blacks, preferred organic pigments include all those commonly employed in the melt colouration of polyesters, for example pigments of the class of the azo, azomethine, anthraquinone, quinophthalone, phthalocyanine, perinone, perylenetetracarboxylic diimide, perylenetetracarboxylic dianhydride, dioxazine, thioindigo, iminoisoindolinone or quinacridone pigments. Metal complexes, for example of azo, azomethine or methine dyes of pigment character, are also suitable.

The polyesters employed can be linear thermoplastic polyesters based on aromatic or aliphatic dicarboxylic acids or mixtures of aromatic/aliphatic dicarboxylic acids with aliphatic diols. The aromatic dicarboxylic acids are e.g. terephthalic acid or isophthalic acid. Possible aliphatic dicarboxylic acids are linear or branched dicarboxylic acids containing up to 20, preferably 4 to 12, carbon atoms, for example azelaic acid, sebacic acid and adipic acid. Examples of possible diols are ethylene glycol, 1,4-butanediol, 1,4-di(hydroxymethyl)cyclohexane or neopentyl glycol, which are condensed with the dicarboxylic acids to produce a polycondensate having a molecular weight preferably between 18,000 and 30,000 and which melts between 60° and 160° C., preferably between 100° and 160° C.

Particularly suitable polyesters for the process of this invention are those containing (a) 25–30 mol. % of radicals of terephthalic acid and 20–25 mol. % of radicals of azelaic acid or the same amount by weight of radicals of an aliphatic dicarboxylic acid containing 4 to 12 carbon atoms, and (b) 50 mol. % of radicals of butanediol and diethylene glycol or triethylene glycol in the ratio 15:1 to 5:1.

In this polyester, about 7 mol. % of the terephthalic acid radicals can be replaced by isophthalic acid radicals. Likewise, the diethylene glycol can contain up to 20% by weight of ethylene glycol.

The polyesters employed in the invention are advantageously at least partially soluble at 80°–90° C. in diacetone alcohol and/or dimethyl formamide or in a mixture of diacetone alcohol and dimethyl formamide.

The concentrate consisting of pigment and polyester is preferably formed by kneading with a salt and a solvent, so that the degree of particle fineness and distribution of the pigment in the polyester is as great as possible. The method is advantageously carried out at elevated temperature, for example between 80° and 95° C., in the presence of an inorganic salt, in particular sodium chloride, but also potassium chloride, sodium sulfate or barium chloride. The salts can be washed out again with water in simple manner. It is advantageous to add a solvent during the kneading, in particular a water-soluble organic solvent, for example diacetone alcohol or dimethyl formamide, in which the polyester is at least partially soluble. After kneading, the concentrate is expediently freed from salts and solvents by treatment with water, and dried.

The same good results are obtained, especially if the pigment particles are already in a very fine state, by means of a flush process, in which the pigments are flushed into the melt or concentrated solution of the polyester.

Suitable fibre-forming linear polyesters with which the concentrates of the invention are melted and processed to masterbatches are in particular those which are obtained by polycondensation of terephthalic acid or an ester thereof with a glycol of the formula HO—$(CH_2)_n$—OH, in which n is an integer from 2 to 10, or with 1,4-di-(hydroxymethyl)cyclohexane, or by polycondensation of a glycol ether of a hydroxybenzoic acid, for example p-($\beta$-hydroxyethoxy)benzoic acid. The term "linear polyesters" also comprises copolyesters which are obtained by partial replacement of terephthalic acid by another dicarboxylic acid and/or by partial replacement of the glycol by another diol.

Particularly preferred linear polyesters, however, are polyethylene terephthalates which are usually identical with the linear polyesters which it is desired to colour. To form the pigment preparation, the polyethylene terephthalate is advantageously mixed with the homogenous mixture of the concentrate consisting of pigment and polyester by suitable methods, the mixture is melted in an extruder (single screw or twin-screw extruder) or continuous kneader and converted into granules. The precessing to granules can be carried out e.g. also without premixing in an extruder by continuous addition of the fine-grained concentrate on the one hand and polyethylene terephthalate granules on the other, in the desired ratio. It is possible to attain the desired content of pigment in the granules of preferably 5 to 25% by addition of the corresponding amount of fibre-forming linear polyester to the concentrate. In general, about equal amounts of concentrate and linear polyester are melted together and processed to cylindrical or rectangular granules. Mixtures of different pigments can also be used to obtain the pigment concentrate. Likewise, it is also possible to use mixtures of different polyesters.

The two-step method has in addition the advantage that special shades can be readily and homogeneously formulated and obtained by the simultaneous use of pigment concentrates of different shades during the processing with fibre-forming polyester to granules. They can also be combined with polyester-soluble colourants.

The pigment preparations obtained according to the invention make it possible to achieve an excellent distribution of the pigments in the polyester in the melt colouration of polyester fibres. There is no impairment of the spinning and stretching process or of the fibre quality. Despite the relatively low melting points of the polyesters employed in the concentrate and present in corresponding amount in the end product, the granulated pigment preparations are not tacky and can therefore even be dried at the temperatures of 160° C. and above conventionally employed in the fibre manufacturing industry.

The colouration of the polyesters with the pigment preparations obtained according to the invention is accomplished by known methods, wherein the polyesters to be coloured are mixed in the form of powders, chips or granules with the pigment preparation, melted in the extruder and pressed to sheets or filaments or cast to boards. In this invention, extrusion to fibres is of particular interest, as the advantages when colouring linear polyesters can here be most clearly observed.

The invention is illustrated by the following Examples in which parts and percentages are by weight unless otherwise stated.

EXAMPLE 1

7.5 kg of linear thermoplastic copolyester, commercially obtainable under the registered tradename of Dynapol L 206 (Dynamit Nobel AG; based on aromatic dicarboxylic acids and aliphatic diols, molecular weight 18000, melting range 90°–115° C.), 5 kg of C.I. Pigment Red 166, 30 kg of finely ground sodium chloride and 4.5 kg of diacetone alcohol, are kneaded for 5 hours at a temperature of 85°–90° C. in a 50 liter divided trough kneader which can be heated and cooled. By addition of water the concentrate is converted into relatively fine-grained granules, which are suspended in about 250 liters of water and subjected to wet grinding. The resulting suspension is filtered and the filter cake is washed free of salt and solvent with water, then dried for 48 hours at 75° C. in a vacuum cabinet. 5 kg of the fine granules obtained are mixed with 5 kg of polyethylene terephthalate powder (obtained e.g. either by grinding granules in a hammer mill with the addition of carbon dioxide or by precipitation from a solution of granules, for example in γ-butyrolactone, by addition of water, collecting the precipitate and drying it) for 3 hours in a drum on a roller gear bed. This mixture is dried for 72 hours in vacuo at 60°–70° C. and then processed in a laboratory Co-kneader, LIST-system (Type PR/ASV 46, Buss) at temperatures between 175° and 242° C. to a strand, which is cut in a cutting machine (FOURNE, WILCO) to cylindrical granules having a diameter of about 3 mm and measuring 2–3 mm in length.

Instead of using a Co-kneader, LIST-system, it is also possible to use with equally good results a Werner & Pfleiderer Co-kneader, Type ZDS-K28 or a Leistritz twin-screw extruder, Type LSM-30.34. The granules have the following composition: 20% of pigment, 30% of copolyester Dynapol L 206, 50% of polyethylene terephthalate. They are very suitable for the melt colouration of polyester fibres.

EXAMPLE 2

9 kg of Dynapol L 206 (cf. Example 1), 6 kg of indanthrone, 24 kg of finely ground sodium chloride and 4.8 kg of diacetone alcohol are kneaded for 4 hours at 85°–90° C. in a 50 liter divided trough kneader. The concentrate is converted into granules by addition of ice and granulated. The resulting granules are suspended in 250 liters of water and subjected to wet grinding. The suspension is filtered and the filter cake is washed free of salt and solvent and then dried for 48 hours at 75° C. in a drying cabinet. As in Example 1, 5 kg of the fine granules obtained are mixed with 5 kg of polyethylene terephthalate powder and processed to blue cylindrical (or ribbon) granules, which are very suitable for the melt colouration of polyester fibres.

EXAMPLE 3

The procedure of Example 1 is repeated, except that Vesturit BL 952 (linear saturated copolyester of Chemische Werke Hüls; melting range 90°–130° C.) is used instead of Dynapol L 206, yielding a further red preparation which is very suitable for the melt colouration of polyester fibres.

EXAMPLE 4

A concentrate is formed from the following ingredients in a 50 liter divided trough kneader:

7.5 kg of Vesturit BL 952 (cf. Example 3), 5 kg of crude β-copper phthalocyanine, 30 kg of finely ground sodium chloride, 4,5 kg of diacetone alcohol. After kneading for 6 hours at 80°–85° C., the concentrate is converted into fine granules by addition of water. These granules are suspended in 500 liters of water and subjected to wet grinding. The suspension is then filtered, and the filter cake is washed free of salt and solvent and dried for 48 hours at 60°–70° C. in a vacuum cabinet. The flowable, 40% granular preparation obtained can be processed with an equal amount of polyethylene terephthalate powder, as described in Example 1, to blue granules containing 20% of β-copper phthalocyanine. These granules are most suitable for the melt colouration of polyester fibres (temperature of the Co-kneader between 185° and 245° C.).

EXAMPLE 5

48 parts of Vitel VPE-3862A (linear saturated copolyester of the Goodyear Co; molecular weight between 20,000 and 30,000, melting range between 100° and 125° C.), 32 parts of the blue pigment of Example 2, 160 parts of finely ground sodium chloride and 43 parts of diacetone alcohol are kneaded for 5 hours at 90° C. in a laboratory kneader. The concentrate is converted into granules by addition of 50 parts of water and granulated. The coarse granules are suspended in 4000 parts of water and ground to fine granules in a toothed colloid mill. After filtration, the filter cake is washed free of salt and solvent and dried at 60°-70° C. in a vacuum cabinet. A somewhat coarse powder is obtained. 150 parts of this powder are mixed with 150 parts of polyethylene terephthalate on a roller gear bed. The mixture is dried at 60°-70° C. in vacuo and then melted in an extruder and processed to cylindrical strands of 3 mm diameter, which are subsequently chopped in a cutting machine to blue cylindrical granules 2 to 3 mm in length. The granules consist of 20% of colourant, 30% of copolyester (Vitel VPE-3862A) and 50% of polyethylene terephthalate, and are most suitable for the melt colouration of polyester fibres.

EXAMPLE 6

A concentrate comprising the following ingredients is formed in a laboratory kneader: 48 parts of a copolyester based on terephthalic acid/azelaic acid-1,4-butanediol/diethylene glycol (melting range 125°-155° C.), 32 parts of carbon black "Printex 400" (Degussa), 128 parts of finely ground sodium chloride and 38 parts of dimethyl formamide. The mixture is kneaded for 5 hours at about 95° C. and then cooled to 50° C. The concentrate is then converted into fine granules by addition of about 40 parts of ice. These granules are suspended in 4000 parts of water and the suspension is stirred for several hours and filtered. The filter cake is washed free of salt and solvent and then dried in vacuo at 60°-70° C. Then 200 parts of the resulting preparation are mixed with 200 parts of polyethylene terephthalate powder. Working up as described in Example 5 yields black granules which are extremely suitable for the melt colouration of polyester fibres.

EXAMPLE 7

(a) 540 parts of polyethylene terephthalate granules are mixed with 60 parts of coloured granules obtained in any one of the preceding Examples by shaking in a closed vessel or on a roller gear table. The mixture of colourless polyethylene terephthalate granules and coloured preparation is dried for about 48 hours at 100° C. and about 0.5 torr and then spun in an extruder melting spinning machine (Inventa type) at a spinning temperature of 290° C., a sojourn time in the extruder of about 10 minutes and a rate of 300 m/min. through a 24-hole spinneret (0.35 mm diameter) to polyester endless primary filaments. These filaments are then stretched on a draw twister at 100° C. in the ratio of 1:4.022. The fibre properties are substantially the same as those of uncoloured fibres.

(b) The same good results are obtained by drying the mixture of uncoloured polyethylene terephthalate and masterbatch granules for 24 to 48 hours at 160° C.

EXAMPLE 8

48 parts of Dynapol L 206 (cf. Example 1), 32 parts of C.I. Pigment Red 88, 160 parts of finely ground sodium chloride and 25.6 parts of diacetone alcohol are kneaded for 5 hours in a laboratory kneader of 0.5 liter capacity which can be heated and cooled. The temperature of the concentrate is between 78° and 82° C. The concentrate is then converted into granules with 55 parts of ice. The somewhat irregular granules obtained are stirred into 3000 parts of water and ground in a toothed colloid mill to uniformly fine granules. After filtration, the filter cake is washed free of salt and solvent and dried at 60°-70° C. in a vacuum cabinet. 100 parts of this dry preparation are mixed with 100 parts of ground polyethylene terephthalate in a Turbula mixer. The mixture is dried at 60°-70° C. in vacuo and extruded at temperatures between 190° and 230° C. to strands of about 3 mm in diameter. These strands are cut in a cutting machine to cylindrical granules of 2-3 mm in length. The abrasion-proof granules consist of 20% of pigment, 30% of copolyester Dynapol L 206 and 50% of polyethylene terephthalate and are most suitable for the melt colouration of polyester fibres.

EXAMPLE 9

The following mixture is kneaded for 5 hours at a temperature of 85°-90° C. in a 0.5 liter capacity laboratory kneader: 48 parts of a copolyester based on terephthalic acid/isoterephthalic acid/azelaic acid-1,4-butanediol/diethylene glycol (melting range 135°-150° C.), 32 parts of C.I. Pigment Violet 23, 160 parts of finely ground sodium chloride and 43 parts of diacetone alcohol. The concentrate is cooled to 50° C. and converted into fine granules by the addition of 30 parts of ice. These granules are suspended in 3000 parts of water of 60°-65° C. and the suspension is stirred for several hours and then filtered. The filter cake is washed free of salt and solvent and subsequently dried in vacuo at 60°-70° C. Then 200 parts of the dry preparation are mixed with 200 parts of polyethylene terephthalate powder. This mixture is dried at 60°-70° C. in a vacuum cabinet, melted in an extruder (temperature range between 180° and 260° C.) and extruded to a strand of 3 mm diameter. This strand is cut to violet cylindrical granules of 2-3 mm in length. The granules have the following composition: 20% of colourant, 30% of copolyester and 50% of polyethylene terephthalate. They are very suitable for the melt colouration of polyester fibres.

EXAMPLE 10

A concentrate comprising the following ingredients is formed in a laboratory kneader: 32 parts of C.I. Pigment Yellow 129, 48 parts of Vesturit BL 950 (linear saturated copolyester marketed by Chemische Werke Hüls; melting range 100'-150° C.), 160 parts of finely ground sodium chloride and 29 parts of diacetone alcohol. The mixture is kneaded for 4 hours (temperature of the concentrate 85°-88°), then cooled to 50° C. and converted into fine granules by addition of about 40 parts of ice. These granules are suspended in 4000 parts of water of about 70° C. and the suspension is ground in a toothed colloid mill to uniform, fine-grained granules, and filtered. The filter cake is washed free of salt and solvent and dried in vacuo at 60°-70° C. Then 200 parts of the resulting fine granules are mixed with 200 parts of polyethylene terephthalate powder. This mixture is dried under the same conditions as described in Example 9 and subsequently extruded to a strand in the temperature range between 180° and 260° C. This strand is cut to yellow cylindrical granules of 2-3 mm in length, which are most suitable for the melt colouration of polyester fibres. The composition of the granules is: 20% of pigment, 30% of copolyester "Vesturit BL 950" and 50% of polyethylene terephthalate.

EXAMPLE 11

32 parts of C.I. Pigment Yellow 110, 48 parts of Vesturit BL 951 (copolyester marketed by Chemische Werke Hüls; melting range 90°-140° C.), 128 parts of finely ground sodium chloride and 25.6 parts of diacetone alcohol are kneaded for 4 hours in a laboratory kneader at 85°-90° C. The concentrate is then cooled and converted at a temperature of about 50° C. with 30 parts of ice into fine granules. These granules are suspended in 4000 parts of water of about 60° C. and the suspension is ground in a toothed colloid mill to uniformly fine granules and then filtered. The filter cake is washed free of salt and solvent and dried in vacuo at 60°-70° C. Then 150 parts of the granules obtained are mixed with 150 parts of ground polyethylene terephthalate. This mixture is dried at 60°-70° C. in a vacuum cabinet and then extruded (temperature range: 180°-260° C.) to a strand of 3 mm diameter. This strand is cut in a guillotine cutter to yellow cylindrical granules of 2-3 mm in length. These granules can be used with very good results according to Example 7 for colouring polyester fibres. Composition of the granules: 20% of colourant, 30% of copolyester "Vesturit BL 951" and 50% of polyethylene terephthalate.

EXAMPLE 12

The following mixture is kneaded for 5 hours at about 85° C. in a laboratory kneader of 0.5 liter capacity which can be heated and cooled: 32 parts of the quinophthalone golden orange pigment of the formula

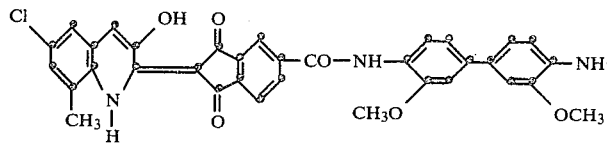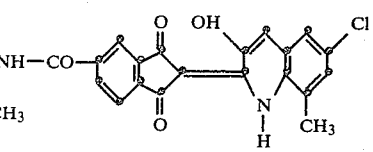

48 parts of Dynapol L 205 (a linear copolyester based on aromatic dicarboxylic acids and aliphatic diols and marketed by Dynamit Nobel AG; average molecular weight about 15000; melting range 85°-135° C.), 160 parts of finely ground sodium chloride and 25.6 parts of diacetone alcohol. The concentrate is then cooled and converted into fine granules at a temperature of about 55° C. with 30 parts of ice. The granules are suspended in 4000 parts of water of 60° C. and the suspension is processed in a toothed colloid mill, then filtered. The filter cake is washed free of salt and solvent and then dried in vacuo at 60°-70° C. Then 100 parts of the granules obtained are mixed with 300 parts of ground polyethylene terephthalate and this mixture is dried in vacuo at 60°-70° C. The preparation is extruded in a laboratory extruder to a strand of 3 mm diameter (temperature range: 180°-260° C.). This strand is cut to cylindrical granules of 2-3 mm in length, which are used for colouring polyester fibres in accordance with Example 7. Composition of the preparation: 10% of pigment, 15% of Dynapol L 205 and 75% of polyethylene terephthalate.

EXAMPLE 13

48 parts of an aliphatic polyester based on sebacic acid/hexanediol and having an average molecular weight of 1550 and a melting range of about 70°-82° C. are melted in a laboratory kneader. To the melt are added 125.5 parts of an aqueous filter cake of C.I. Pigment Orange 43 with a solids content of 25.5%, and the mixture is kneaded at a temperature of 87° C. until the separated water is completely clear and colourless. Then 40 parts of ice are added and kneading is continued in the presence of the total amount of water (separated from the kneading mixture or added in the form of ice) with cooling. The mixture is converted into fine granules, which are dried in vacuo at 50° C. Then 100 parts of these granules are mixed with 1233 parts of polyethylene terephthalate powder. After drying in vacuo at 50° C. this mixture is extruded in a laboratory single screw extruder (temperature range: 180°-260° C.) to a strand of 3 mm diameter. This strand is then cut in a guillotine cutter to cylindrical pellets of about 3 mm in length. Considering the low pigment content of 3%, these pellets can be used with excellent results for the melt colouration of polyester fibres in accordance with the particulars of Example 7. The granules have the following composition: 3% of colourant, 4.5% of aliphatic polyester and 92.5% of polyethylene terephthalate.

EXAMPLE 14

A laboratory kneader which can be heated and cooled is charged with 48 parts of Vesturit BL 952 (cf. Example 3) and 192 parts of cyclohexanone. When the polyester has dissolved completely, 125.5 parts of the aqueous filter cake of C.I. Pigment Orange 43 employed in Example 13 are added at a temperature of 88° C. and the batch is kneaded until the water which has gradually separated is clear and colourless. The water is then decanted, the mixture is cooled and freed from solvent and water at 60°-70° C. in vacuo. The hard mass is then broken up and ground. Then 100 parts of the ground preparation are mixed with 100 parts of ground polyethylene terephthalate. This mixture is dried in vacuo at 60°-70° C. and extruded (temperature range: 180°-260° C.) to a strand, which is cut to pellets of 3 mm diameter and 2-3 mm in length in a guillotine cutter. These granules are most suitable for the melt colouration of polyester fibres. Composition of the granules: 20% of colourant, 30% of Vesturit BL 952 and 50% of polyethylene terephthalate.

EXAMPLE 15

The following mixture is kneaded for 4 hours at 90° C. in a laboratory kneader: 32 parts of C.I. Pigment Violet 19, 48 parts of Dynapol L 206 (cf. Example 1) 128 parts of finely ground sodium chloride and 25.6 parts of diacetone alcohol. With simultaneous cooling, 30 parts of ice are added to the concentrate and the resulting granules are suspended in water and the suspension is ground to fine granules in a toothed colloid mill. These granules are suspended in 3000 parts of water of about 60° C. While keeping this temperature, the suspension is stirred for 1 hour and then filtered. The filter cake is washed free of salt and solvent and then dried at 60°–70° C. in a vacuum cabinet. Then 50 parts of the dry, fine granules are mixed with 150 parts of ground polyethylene terephthalate. This mixture is dried in vacuo at 60°–70° C. and extruded (temperature range: 180°–260° C.) to a smooth strand, which is cut to granules of about 3 mm in diameter and 2–3 mm in length. Composition of the granules: 10% of colourant, 15% of Dynapol L 206 and 75% of polyethylene terephthalate.

EXAMPLE 16

15 parts of C.I. Pigment Red 166, 17 parts of crude β-copper phthalocyanine, 48 parts of an aliphatic polyester (based on sebacic acid/ethylene glycol; molecular weight about 4000–5000, melting range about 72°–81° C.), 190 parts of finely ground sodium chloride and 55.6 parts of diacetone alcohol are kneaded for 4 hours at 60° C. in a laboratory kneader. The concentrate is then cooled and converted into fine granules by the addition of 40 parts of ice. These granules are suspended in 4000 parts of water and the suspension is ground to fine granules in a toothed colloid mill, then filtered. The filter cake is washed free of salt and solvent and dried in vacuo at 50° C. Then 50 parts of the granules are mixed with 350 parts of polyethylene terephthalate powder. This mixture is dried and extruded (temperature range: 180°–260° C.) to a strand, which is cut to granules. Composition of the granules: 5% of colourant, 7.5% of aliphatic polyester, 87.5% of polyethylene terephthalate. Polyester fibres can be coloured in the melt with these granules in an interesting navy blue shade.

EXAMPLE 17

32 parts of C.I. Pigment Red 224, 48 parts of Vesturit BL 952 (cf. Example 3), 160 parts of finely ground sodium chloride and 25.6 parts of diacetone alcohol are kneaded for 4 hours at 88° C. in a laboratory kneader of 0.5 liter capacity which can be heated and cooled. The concentrate is cooled and relatively fine granules are obtained by addition of 30 parts of ice. These granules are stirred in water and ground in a toothed colloid mill to uniformly fine granules. The suspension is filtered and the filter cake is washed free of salt and solvent and dried in vacuo at 60°–70° C. Then 100 parts of the dry granules are mixed with 100 parts of ground polyethylene terephthalate. This mixture is dried in vacuo at 60°–70° C. and then extruded (temperature range between 180° and 260° C.) to strands, which are cut to granules in a guillotine cutter. These granules are most suitable for colouring polyester fibres in the melt. Composition of the granules: 20% of colourant, 30% of Vesturit BL 952 and 50% of polyethylene terephthalate.

EXAMPLE 18

The following mixture is kneaded for 4 hours at 85° C.: 32 parts of C.I. Pigment Brown 26, 48 parts of Dynapol L 206 (cf. Example 1), 160 parts of finely ground sodium chloride and 25.6 parts of diacetone alcohol. While cooling, 30 parts of ice are added to the concentrate, whereupon fine granules are obtained. An aqueous suspension of these granules is ground in a tooth colloid mill and filtered. The filter cake is washed free of salt and solvent and then dried in vacuo at 60°–70° C. Then 100 parts of the granules obtained are mixed with 100 parts of a copolyester of terephthalic acid/isophthalic acid/azelaic acid-ethylene glycol (melting range between 185° and 200° C.). This mixture is dried in vacuo at 60°–70° C. and extruded (temperature range: 150°–230° C.) to a strand, which is cut in a guillotine cutter. The resulting granules have the following composition: 20% of colourant, 30% of copolyester Dynapol L 206 and 50% of the high melting copolyester. They are most suitable for colouring polyester fibres in the melt.

What is claimed is:

1. A method for the production of a pigment preparation for colouring linear polyesters in the melt, which comprises forming a concentrate from 20 to 80 parts of pigment and 80 to 20 parts of a linear thermoplastic polyester comprising a polycondensate of dicarboxylic acids with diols, said acids of aromatic, aliphatic or mixtures thereof which melts between 60° and 160° C., by kneading in the presence of an organic or inorganic salt and a solvent which serves to increase the distribution of the pigment in the thermoplastic polyester and at least partially solubilize said polyester, mixing said concentrate with a fiber forming linear polyester comprising a polycondensate of terephthalic acid, esters thereof, or mixtures of terephthalic acid and other dicarboxylic acids, with a glycol of the formula HO—(CH)$_n$—OH(n=2–10), 1,4-di(hydroxymethyl)cyclohexane, or mixtures of said glycols with other diols, or a polycondensate of a glycol ether of a hydroxybenzoic acid, melting the concentrate-polyester mixture and processing it to granules.

2. A process according to claim 1, which comprises forming the concentrate from 40 to 60 parts of pigment and 60 to 40 parts of a polyester.

3. A process according to claim 1, wherein the concentrate is mixed and melted with the fibre-forming linear polyester in an amount such that the resulting granules contain 3 to 30% by weight of pigment.

4. A process according to claim 3, wherein the concentrate is mixed and melted with the fibre-forming linear polyester in an amount such that the resulting granules contain 5 to 25% by weight of pigment.

5. A process according to claim 1, wherein the linear thermoplastic polyester consists of
   (a) 25–30 mol. % of radicals of terephthalic acid and 20–25 mol. % of radicals of an aliphatic dicarboxylic acid containing 4 to 12 carbon atoms, and
   (b) 50 mol. % of radicals of butanediol and diethylene glycol or triethylene glycol in the ratio 15:1 to 5:1.

6. A linear polyester which contains, as colouring component, a pigment preparation obtained by the process of claim 1.

7. The process according to claim 5, wherein said aliphatic dicarboxylic acid is azelaic acid.

8. A pigment preparation according to claim 6 which contains 3 to 30% by weight, of pigment.

* * * * *